April 21, 1964
G. S. WING ETAL
3,129,630
BLIND FASTENER UTILIZING A DISTORTABLE COLLAR
AND HAVING AUXILIARY LOCKING MEANS
Filed Dec. 14, 1960
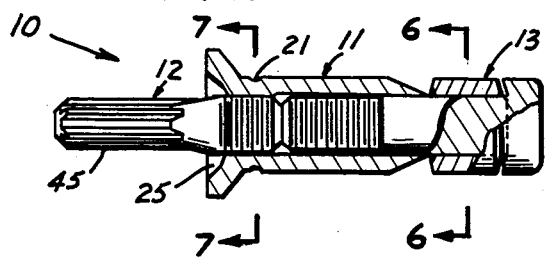
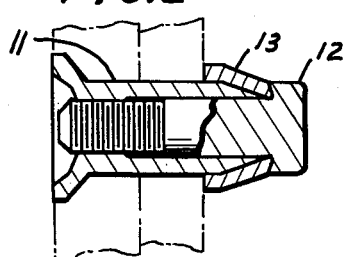
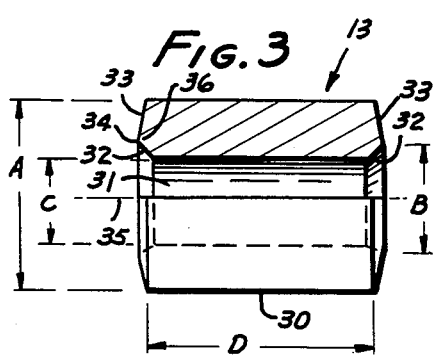
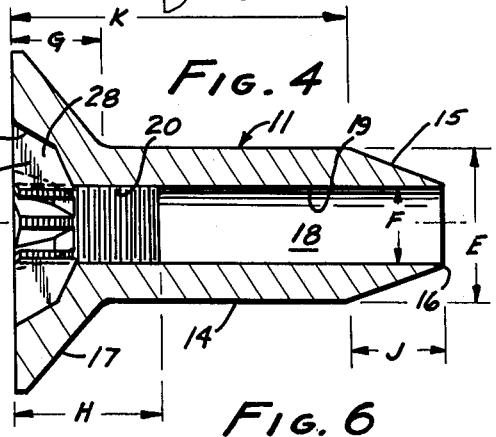
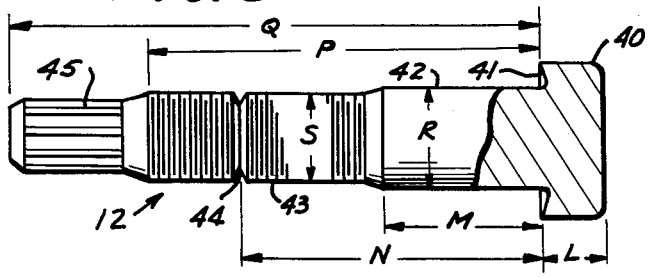
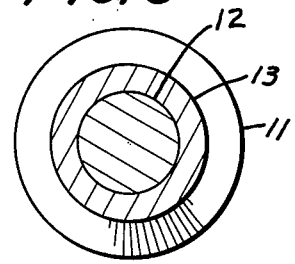
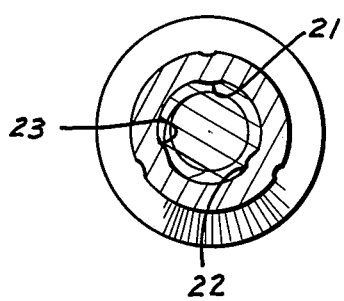
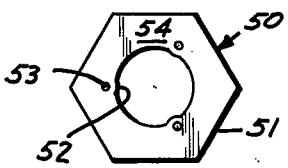
GEORGE S. WING,
MICHAEL M. SCHUSTER
INVENTORS;
BY Angus & Mow
ATTORNEYS.

United States Patent Office 3,129,630
Patented Apr. 21, 1964

3,129,630
BLIND FASTENER UTILIZING A DISTORTABLE COLLAR AND HAVING AUXILIARY LOCKING MEANS
George S. Wing, Palos Verdes Estates, and Michael M. Schuster, Inglewood, Calif., assignors to Hi-Shear Corporation, Torrance, Calif., a corporation of California
Filed Dec. 14, 1960, Ser. No. 75,744
1 Claim. (Cl. 85—40)

This invention relates to a blind fastener.

A blind fastener is used in those situations wherein only one side of the work is readily accessible. A well-known type of blind fastener is that which includes a sleeve adapted to fit in a hole through an object or objects to be joined, a collar adapted to be drawn up over an end of the sleeve, and a mandrel which passes through the collar and sleeve and has a head that is adapted to force the collar over the end of that sleeve.

It is evident that it is possible to pull this mandrel either by an axial force, or by threading the mandrel into the sleeve and pulling the head by turning the mandrel. This latter technique is the more desirable because it can be carried out with more convenient shop tools. However, there is a disadvantage inherent in this type of assembly unit because of the tendency of the mandrel to come unthreaded and permit the fastener to fall apart after being vibrated for a while. Therefore, this type of fastener has not been used as extensively as it would be if there were provided some means for firmly locking it once it has been set.

It is an object of this invention to provide a blind fastener of the above type wherein a threaded mandrel and sleeve are firmly locked together so that a substantially vibration proof blind fastener results.

A fastener according to this invention includes a sleeve having a shank adapted to fit in a hole in an object, the shank having a headed end and a chamfered end. A passage extends axially through the sleeve, and has an internal thread to which a mandrel having an external thread is threaded. The mandrel passes through the sleeve and projects from both sides thereof. At the end projecting from the headed end of the sleeve there is torque tool engaging means. At the other end there is a head for engaging a collar which surrounds the mandrel, and which is adapted to be forced over the chamfered end of the sleeve when the mandrel is turned to advance the mandrel head toward the sleeve.

According to a preferred feature of this invention, the internal threads of the sleeve are inwardly radially deformed so as to exert a locking force on the mandrel thread to keep the mandrel from coming unthreaded. This holds the blind fastener firmly assembled.

The above and other features of this invention will be fully understood from the following detailed description and the accompanying drawings in which:

FIG. 1 is a side elevation partly and cut away cross section showing the presently preferred embodiment of the invention in its unset configuration;

FIG. 2 is a side elevation partly and cut away cross section showing the fastener FIG. 1 in its set configuration;

FIG. 3 is a cross section of the collar portion of the fastener FIG. 1;

FIG. 4 is a cross section of the sleeve portion of the embodiment of FIG. 1;

FIG. 5 is an elevation partly and cut away cross section of the mandrel portion of the fastener FIG. 1;

FIGS. 6 and 7 are cross sections taken at lines 6—6 and 7—7 of FIGS. 1 and 4, respectively; and FIG. 8 is an end view of an optional embodiment of sleeve which may be substituted for the sleeve of FIG. 1.

As can best be seen in FIG. 1 a fastener 10 according to the invention includes a sleeve 11, a mandrel 12, and a collar 13, assembled with the mandrel threaded into the sleeve with the collar disposed around the mandrel. The loosely assembled components except for the sleeve head as shown in FIG. 1 all have an outer diameter which is no greater than the diameter of the hole in which the fastener is to be placed. The outer diameter of the shank of the sleeve is substantially the same diameter as the hole, so as to make a close fit.

Sleeve 11 is best shown in FIG. 4. It includes a substantially cylindrical shank 14 adapted to fit in the hole in the object, an external chamfer 15 which tapers down to a sharp point 16, and a counter sink type head 17. The chamfer and head are at opposite ends of the shank. An internal passage 18 extends from end to end of the sleeve, and includes a cylindrical portion 19 at the chamfered end. The other end of the passage has an internal thread 20. This internal thread is radially inwardly distorted at three points 21, 22, 23 by dimpling the outside surface of the shank. The axial location of these distortions is relatively close to the sleeve head. The reason for this selection of location is that it has been found advantageous to draw as little of the mandrel thread past these distortions as possible, because, while galling does not ordinarily occur, the risk of galling is substantially reduced in this manner.

Torque tool engaging means 25 is formed in the headed end of the fastener. The particular means shown in the embodiment of FIG. 4 has six recesses 26 extending radially outward from the passage. These recesses are relatively shallow and do not extend into the shank but instead are entirely contained in the head. Each of these recesses has a sloping bottom 27 and a driving wall 28, these walls are all parallel to the central axis 29 of the sleeve. This type of recess has been found to be advantageous in that it permits a maximum of torque to be applied to the head without distorting or galling any of the surfaces.

Collar 13 is shown in detail in FIG. 3. It has a central section 30 which is exteriorally cylindrical. An inner passage 31 extends from end to end. Each end is provided with an innermost and outermost chamfer 32, 33 respectively, these chamfers intersecting at lines 34 which are disposed medially between the inner and outer walls of the collar. The outermost chamfers make an angle of about ten degrees with the normal to the central axis 35. The innermost chamfers make an angle of about forty-five degrees thereto. Each pair of chamfers forms an angle 36 which faces toward the body of the collar.

The mandrel 12 is shown in FIG. 5. It includes a head 40 which bears an umbrella face 41. This face constitutes a recess in the head contiguous to which there is a cylindrical section 42. The diameter of cylindrical section 42 is close to that of passage 31 in the collar, and of cylindrical portion 19 of passage 18 in the sleeve, there being just sufficient difference between these dimensions to allow the parts readily to be fitted upon each other. Contiguous to cylindrical section 42 there is an external thread 43 which is interrupted at one axial location by a shear groove 44, this shear groove forming the location of the least cross section of the mandrel. When the mandrel is strongly torqued, the tendency for it to break will be at the groove. On the other side of the thread from the head of the mandrel, there is disposed torque tool engaging means 45 which in the example shown comprises splines.

From the following exemplary dimensions for one device according to this invention of the type shown in FIG. 1, it will be seen that when the fastener is set to the configuration shown in FIG. 2, the groove where the shearing action occurs will be almost to the upper surface of the head and will have passed beyond the distortions in the sleeve threads while this distortion is in the case of the counter sink head, about as close to the head as can be, without distorting the driving faces. This minimizes the amount of thread which must be drawn past the distortions.

*Dimensions for a ⁵⁄₁₆″ Fastener (Inches)*

| Collar 13 | | Sleeve 11 | | Mandrel 12 | |
|---|---|---|---|---|---|
| A | .199 .197 | E | .199 .197 | L | .070 .060 |
| C | .1400 .1385 | F | .141 | M, mean grip | −.136 |
| D | .238 | G | .0765 .0745 | N, mean grip | +.159 |
| B | .165 .155 | H | .190 .146 | P, mean grip | −.325 |
| | | K, mean grip | +.076 | Q, mean grip | +.67 |
| | | | | R | .1380 .1370 |
| | | | | S | .1207 |

An alternate embodiment of a head for the sleeve is shown in FIG. 8 where the head of a sleeve 50 is shown as an externally hexagonal structure, outer surfaces 51 forming torque tool engaging means. Because the upper surface of this head is smooth, it is possible to provide thread deformations 52 at this face by dimpling or staking the head at points 53. When this device is set, the groove will have been drawn past the upper face 54 of the head so as to be beyond the locking feature.

The use of this device should be evident from the above drawings. The device, loosely assembled as in FIG. 1, is placed in a hole in an object. Then counter-rotative torque tools are applied to the mandrel and the sleeve. In the example of FIG. 1 a driver is inserted into the recesses in the sleeve head and the splines are placed in appropriate jaws in the tool. Then the tool is counter rotated, drawing the head of the mandrel toward the sleeve. The collar climbs at least partially upon the chamfered end of the sleeve, thereby forming an enlarged end.

The movement of the collar over the sleeve is facilitated by the chamfers formed on the collar. The innermost chamfer on the end adjacent to the sleeve is enabled to begin its climb more easily over the chamfered end. The umbrella face and the outermost chamfer at the other end of the collar apply an inward component of force tending to reduce the resistance to flaring at the other end of the collar.

After the mandrel has pulled the collar to where the collar abuts the object, there is increased resistance to further turning of the mandrel. The torque will then increase to the point where it overcomes the resistance to shear at the groove. Thereupon the splined portion with that portion of the thread on its side of the groove will shear away and leave the device installed. It has been found that the radially inward distortion of the thread acts as a firm lock and that this device is substantially vibration-proof as opposed to other devices of a similar nature which readily come unthreaded, rendering uncertain the joint which they were intended to assemble.

The same result obtains when the sleeve shown in FIG. 8 is substituted for that shown in FIG. 1, in this case the locking being accomplished at the very end of the sleeve.

This invention is not to be limited by the embodiments shown in the drawings and described in the description which are given by way of example and not of limitation, but only in accordance with the scope of the appended claim.

We claim:

A blind fastener comprising: a sleeve including a substantially cylindrical shank, a head at one end of the shank, a plurality of torque tool receiving recesses in said end, each of said recesses being relatively shallow and having a wall adapted to make driving, surface contact with the torque tool, an exterior chamfer at the other end of said shank forming a sharp point, said sleeve having an axial passage extending from end to end thereof, and an internal thread in said passage adjacent to the headed end of the sleeve, said thread being inwardly radially distorted at at least one axial location adjacent to the head; a mandrel having a head adjacent one end thereof, said head having an inclined undercut in a radial face thereof, a cylindrical section on said mandrel contiguous to the undercut face and extending away therefrom, an exterior thread on said mandrel contiguous to the cylindrical section, a shear groove in said mandrel along said thread, and a splined section adjacent to the thread for receiving a torque tool, said sharp pointed end of the sleeve closely fitting the cylindrical section of the mandrel; and a substantially cylindrical collar adapted to fit closely upon the cylindrical section of the mandrel and abut the undercut face, a pair of chamfers at each end of the collar, the innermost and outermost of the chamfers intersecting at a medial line disposed between the inner and outer walls of the collar, each pair of chamfers forming a convex surface on each opposite end of the collar, said outermost chamfers having substantially the same slope as said inclined undercut and being longer than said innermost chamfers, whereby with the threads of the mandrel and the sleeve in threaded engagement the fastener may be passed through a hole in an object with the sleeve head bearing against one side thereof, counter-rotative torque applied between the sleeve and the mandrel drawing the collar at least partially over the sleeve to form an expanded head on the other side of the objects, the radial distortion of the sleeve threads causing the sleeve to grip the mandrel and hold it against unthreading, that portion of the mandrel bearing the torque tool engaging means being sheared off by application of sufficient torque to shear the mandrel section at the groove.

References Cited in the file of this patent

UNITED STATES PATENTS

| 1,083,217 | McClellan | Dec. 30, 1913 |
| 2,754,871 | Stoll | July 17, 1956 |
| 2,765,699 | La Torre | Oct. 9, 1956 |
| 2,915,934 | La Torre | Dec. 8, 1959 |
| 2,991,816 | Harbison et al. | July 11, 1961 |